United States Patent
Kim

(10) Patent No.: US 8,736,582 B2
(45) Date of Patent: May 27, 2014

(54) TIME DOMAIN REFLECTOMETER TOUCH SCREEN SENSOR

(76) Inventor: Kihong (Joshua) Kim, Kanata (CA)

(*) Notice: Subject to any disclaimer, the term of this patent is extended or adjusted under 35 U.S.C. 154(b) by 667 days.

(21) Appl. No.: 12/955,480

(22) Filed: Nov. 29, 2010

(65) Prior Publication Data
US 2011/0128257 A1 Jun. 2, 2011

Related U.S. Application Data

(60) Provisional application No. 61/265,288, filed on Nov. 30, 2009, provisional application No. 61/264,831, filed on Nov. 29, 2009.

(51) Int. Cl.
*G09G 5/00* (2006.01)

(52) U.S. Cl.
USPC .................................. 345/175; 178/18.09

(58) Field of Classification Search
USPC .............. 345/173–177; 178/18.03–18.09; 715/863, 864
See application file for complete search history.

(56) References Cited

U.S. PATENT DOCUMENTS

| | | | | |
|---|---|---|---|---|
| 4,791,416 A | * | 12/1988 | Adler | 345/177 |
| 4,825,212 A | * | 4/1989 | Adler et al. | 345/177 |
| RE33,151 E | * | 1/1990 | Adler | 345/177 |
| 5,149,918 A | * | 9/1992 | Kozik et al. | 178/18.05 |
| 6,078,315 A | * | 6/2000 | Huang | 345/177 |
| 6,137,282 A | * | 10/2000 | Macke et al. | 324/71.1 |
| 6,160,826 A | | 12/2000 | Swanson et al. | |
| 6,392,167 B1 | * | 5/2002 | Nakagawa | 178/18.04 |
| 2005/0212775 A1 | * | 9/2005 | Lee | 345/173 |
| 2008/0029691 A1 | | 2/2008 | Han | |
| 2009/0237376 A1 | * | 9/2009 | Bridger | 345/175 |
| 2010/0170725 A1 | * | 7/2010 | Au-Yeung et al. | 178/18.09 |
| 2010/0321343 A1 | * | 12/2010 | Chou et al. | 345/175 |

\* cited by examiner

*Primary Examiner* — Tom Sheng
(74) *Attorney, Agent, or Firm* — Timothy D. Bennett; Emerson, Thomson, Bennett, LLC

(57) ABSTRACT

TDR (time domain reflection) technology may be used in optical domain or in electrical domain. For electrical TDR, single layer ITO glass may form a transmission line as a base TDR touch sensor. When the touch sensor is paired, the existing internal metal line of the display device may be reused as a TDR sensor and the ITO glass may be removed. When touched, the TDR profile is changed dynamically from baseline to the particular profile due to its dynamic impedance profile change across the display screen. Likewise, for optical TDR touch sensing, 2 dimensional optical slab waveguide is used to carry OTDR signal. When touched, the profile is changed due to this perturbation mainly by evanescent field changes on that particular position.

3 Claims, 13 Drawing Sheets

TIME DOMAIN REFLECTOMETER TOUCH SCREEN SENSOR

This application claims priority from U.S. Provisional Ser. No. 61/265,288, entitled TIME DOMAIN REFLECTOMETER TOUCH SCREEN SENSOR, filed Nov. 29, 2009, and U.S. Provisional Ser. No. 61/264,831, entitled OPTICAL REFLECTOMETER TOUCH SCREEN SENSOR, filed Nov. 29, 2009, both which are incorporated herein by reference.

I. BACKGROUND OF THE INVENTION

A. Field of Invention

The present invention relates generally to touch-screen displays, and more specifically to a high-resolution touch screen display with multi-touch capability either using electrical time domain reflection or optical time domain reflection profile.

B. Description of the Related Art

There are about a dozen technologies available in the field of touch screen sensor that applies onto display unit such as LCD (Liquid Crystal Display), CRT, and Plasma display and so on. ATM machine display unit and MP3 display in a consumer product are well known daily encountered examples of the field. Recently as a new technology advance in this field, 'Multi-Touch' capability has been added onto this conventional touch screen technology, which has created a new generation of this field in a way it shifts the paradigm of man machine interactive device as simple menu-driven single touch display interface to more versatile gesture interactive tool.

Among many other possible technologies, FTIR (frustrated total internal reflection) based multi-touch technology shown in U.S. Patent Application Publication US2008/0029691 A1 assigned to Jefferson Y. Han is noteworthy of its image sensing technology for multi-touch sensing. When fingers or any objects touch the overlay optical sensor surface which normally confines (infrared or invisible) the flooding light by TIR (total internal reflection) condition, the light start to emanate through the area of the frustrated TIR created by a touch (or multiple touches) event and at the same time the locations of light openings can be captured by external image array sensor or possibly embedded image sensors in LCD substrate as shown in FIG. 1. The captured locations of the touched areas are then to be signal-processed in a sequential time order to interpret the gesture for the finger motion through computer software. This invention, however, unless LCD panel manufacturer invest on embedded sensor array in TFT(Thin Film Transistor)—LCD array process, create extra volume to place the external camera at least in its focal distance to capture the image properly so that it makes the whole unit bulky which is not desirable for their thinner and wall-mountable purpose.

The projected-capacitive touch (PCT) technology is another popular and well known technology that has multi-touch capability. (FIG. 3) But because PCT uses ITO (indium tin oxide) metal layer on glass or in general any transparent material such as acrylic board, the brightness of overall display is diminished due to its opaqueness. Moreover, in order to keep a reasonable SNR (Signal-to-noise ratio) for touch sensitivity, increasing the size of screen will result in increasing the thickness of ITO layer, which makes the sensor panel even more opaque. This is especially critical for multi-ITO layers. This becomes why the technology is limited to the small handheld type of application. So it has been a challenge for PCT to be applied successfully into large flat panel display monitor such as Flat-Panel (FP) TV. The present invention is reducing or even removing such layer the number of ITO layers by applying Time domain reflectometer (TDR) processing.

SAW (Surface Acoustic Wave) technology can be another multi-touch touch screen method that are currently available and can be implemented to keep an optical transparency with reasonable size of display. SAW is using ultrasonic transducers with some sophisticated hardware or software implementation to keep the sensor linearity meaningful. Shadowing issue that makes the recognition of the second touch in the shadow region of the first difficult is another hurdle for multi-touch capability. Another technology that has shadowing effect is 'infrared touch' technology Infrared touch uses the infrared light source array at one side of display panel and the detector array at the opposite side of it as shown in FIG. 2. The infrared touch method is straight forward in a sense that it locates the touched area by looking at the shadow area of the opposite side of photo detector array but with the drawback of the shadowing effect. In other words, it has difficulty to tell the second touch behind the shadow.

II. SUMMARY OF THE INVENTION

The present invention described in this patent application uses TDR (time domain reflection) concept either in electrical or optical domain. TDR in electrical domain is the well known technology for measuring characteristic impedance of transmission line as a function of time, which, then, translates time points into the physical locations of the touch events. A very thin conductor line coated or deposited on any transparent display panel is used to form a transmission line as a base sensor electrode structure. As fingers or any external materials touch or approach onto the sensor, the TDR profile is changed from baseline profile to that particular TDR profile due to their capacitive couplings onto the sensor transmission line or electrode: The time domain touch location is matched to physical location of the electrode transmission line as follows;

$$X\text{touched} = (Td/2) * \text{velocity of light in touch medium} \quad (\text{eq}1)$$

(where typical touch medium consists of glass and air and Td is the absolute impairment location in time domain reflectometer profile)

Specific locations of the touch events can be further processed to extract the location and weight of touch by subtraction of the baseline profile from the measured profile to extract excessive amount from characteristic impedance of transmission electrode line, where characteristic impedance represent non-touched ideal transmission line electrode's impedance.

Further, through subsequent capture of the TDR profile in a time sequential order, a gesture of fingers or objects can be traced through appropriate application firmware/software like video capture processing routine.

The major difference between the present invention and prior arts of capacitive touch sensor is that TDR method is using one dimensional sensor to locate a point in a two dimensional plane by the help of time domain information. In other words, TDR does not require $2^{nd}$ dimension axis to define (sense) the location in the panel which is 2 Dimensional. Moreover, TDR profile of the transmission line sensor is not blocked by touch unless it creates short circuit condition. Therefore, there is no shadowing effect involved, which is very encouraging in a way that enable the technology Multi-Touchable.

Same arguments can also be applied in Optical time-domain reflectometer (OTDR) for touch sensing mechanism. It is well-known that OTDR is used to characterize the reflection profile along the optical waveguide, such as fiber optic cable. In this invention, when optical waveguide is touched even at the outside of the waveguide or fiber when there is no protective layer such as cladding layer, the optical reflection behavior for probing optical signal is changed abruptly and creates a OTDR dip at the position of touch with the same time location as (Eq1) in OTDR profile. Note that both electrical domain TDR and OTDR are commonly used the speed of light to calculate the touch position.

The change of reflection profile as a touch event comes from the fact that the changes of guiding condition of optical signal which makes less Rayleigh back scattering to the light sending position. This less reflection signal amount results from the leakage of scattering light at the position where total-internal-reflection condition has been perturbed by touch event.

Touch event, such as gesture, regeneration will be followed same as in the fore-mentioned electrical TDR method.

Still other benefits and advantages of the invention will become apparent to those skilled in the art to which it pertains upon a reading and understanding of the following detailed specification.

III. BRIEF DESCRIPTION OF THE DRAWINGS

The invention may be better understood by reading the foregoing description of the preferred embodiments of the invention, in conjunction with the appended drawings wherein.

Figure 8:
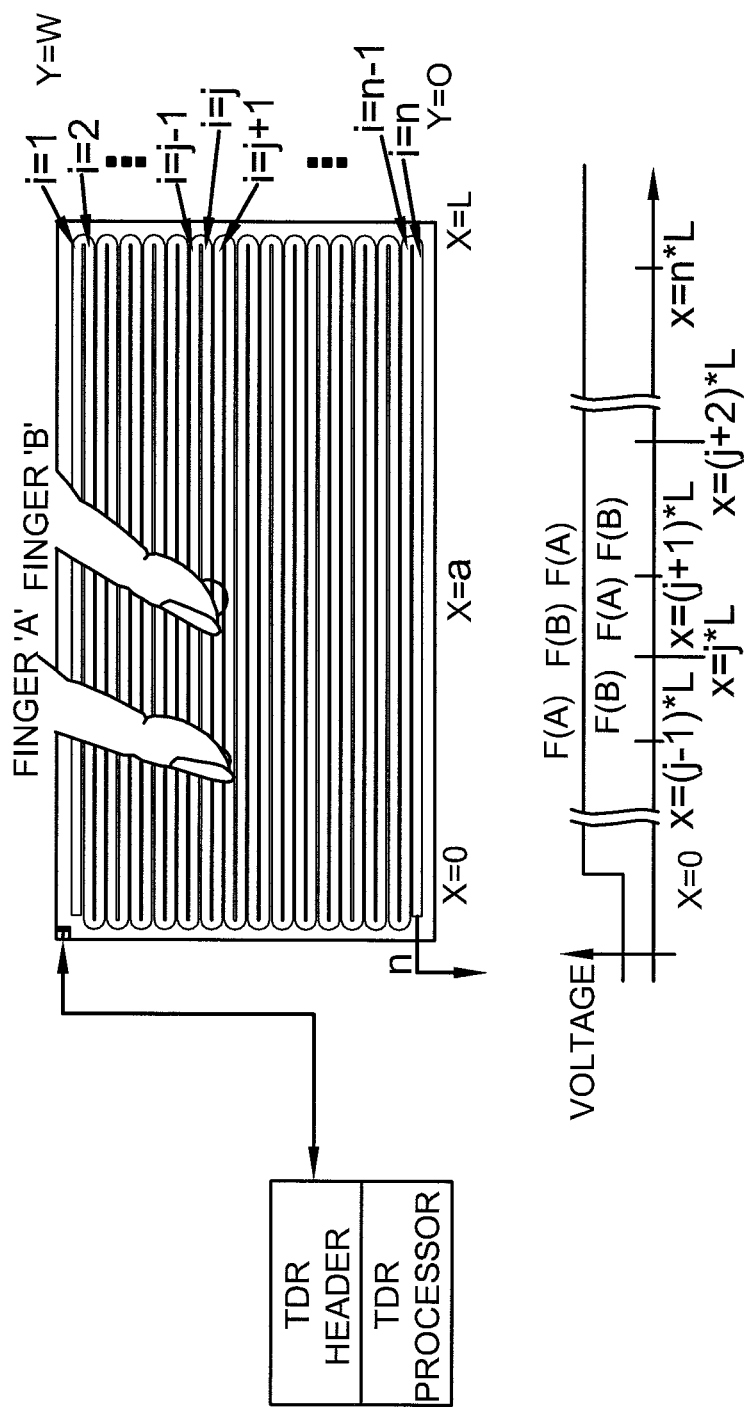

FIG. 8 is a schematic illustration of one embodiment of the present invention. Six sunken locations in TDR profile represent capacitive discontinuities induced by the two fingers; Finger 'A' and finger 'B' in time-domain.

Figure 9:
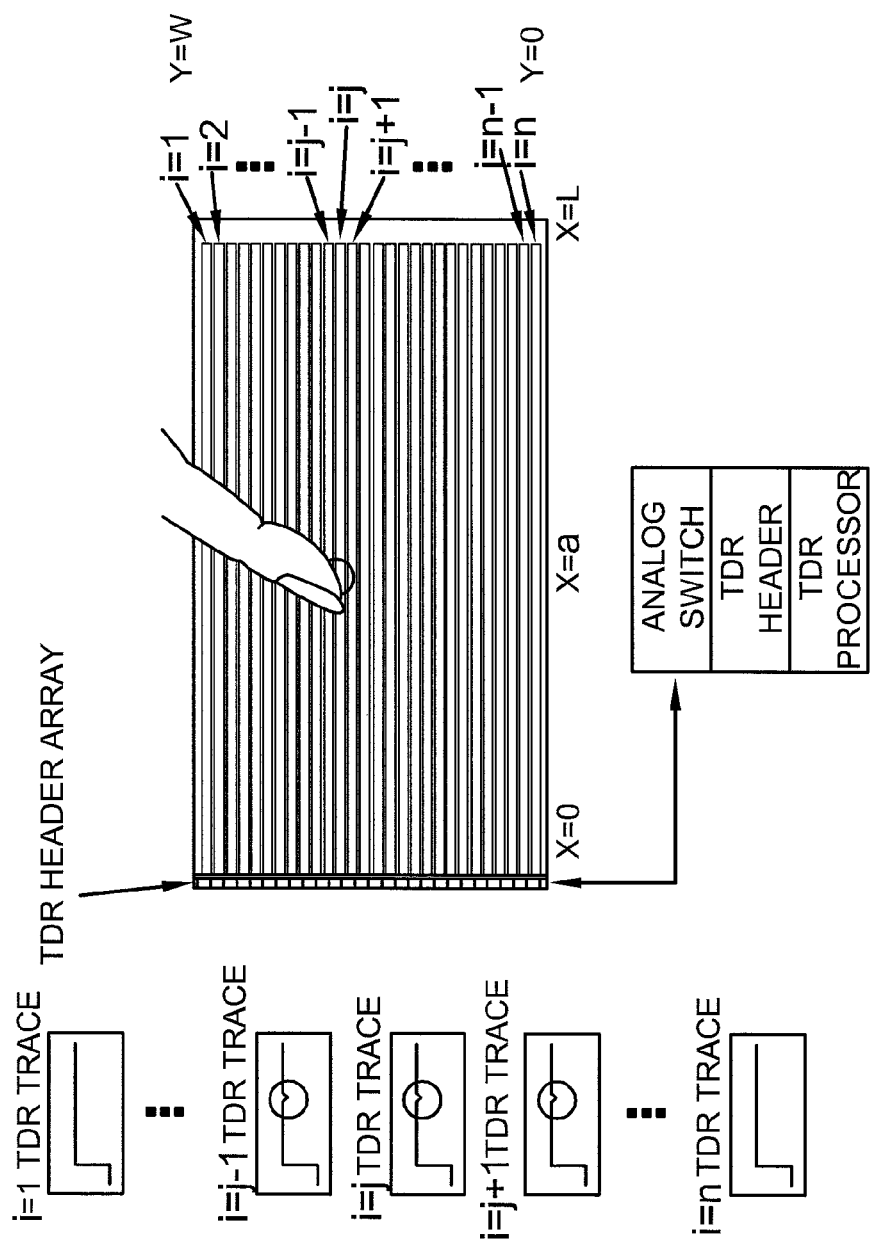

FIG. 9 is a schematic illustration of one embodiment of the present invention. ITO sensor electrodes are all separate and driven by one TDR header using analog switch in time-multiplexed manner.

Figure 10:
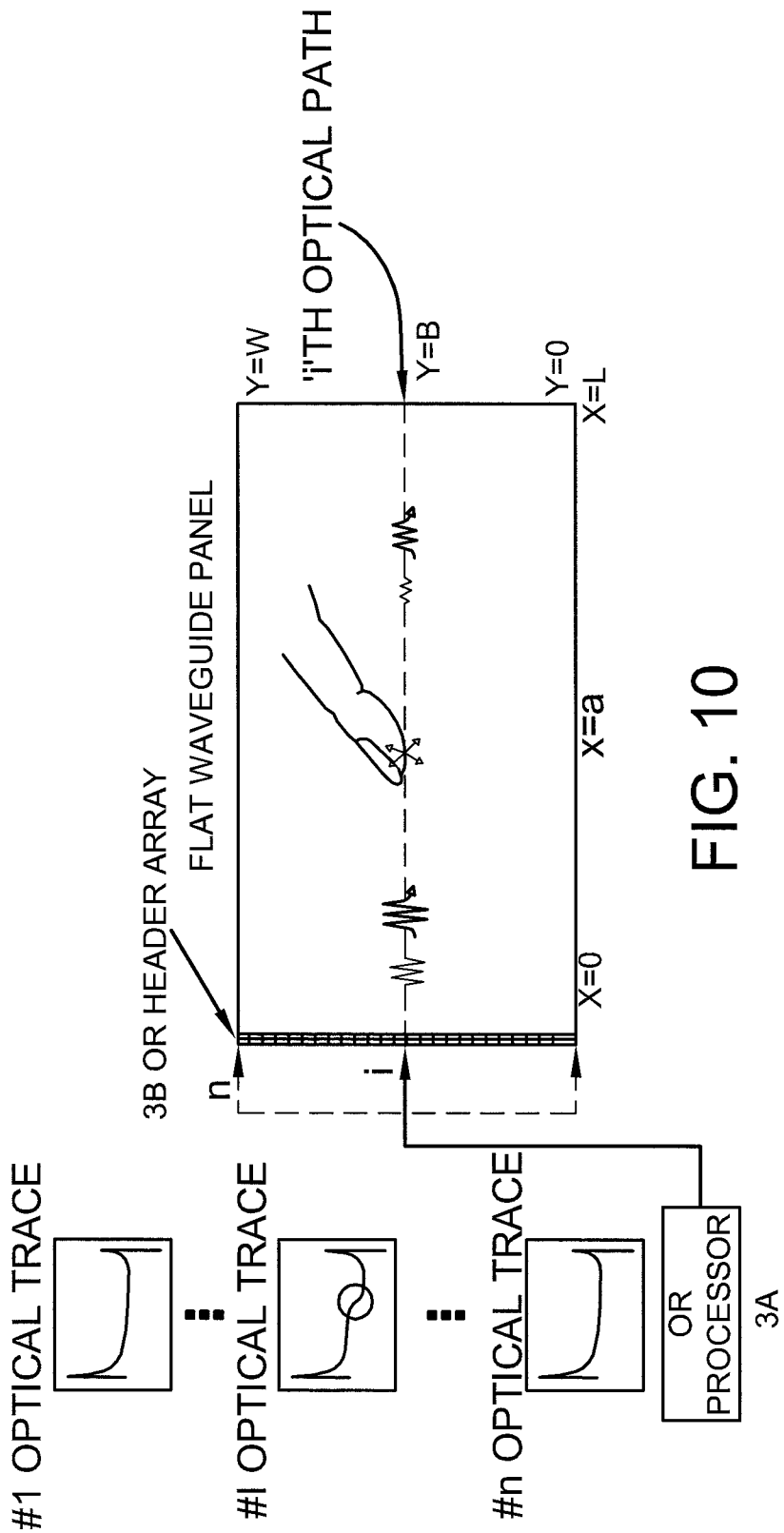

FIG. 10 is a schematic illustration of a preferred embodiment of the present invention: 2D OTDR (2 dimensional optical time domain reflectometer).

Figure 11:
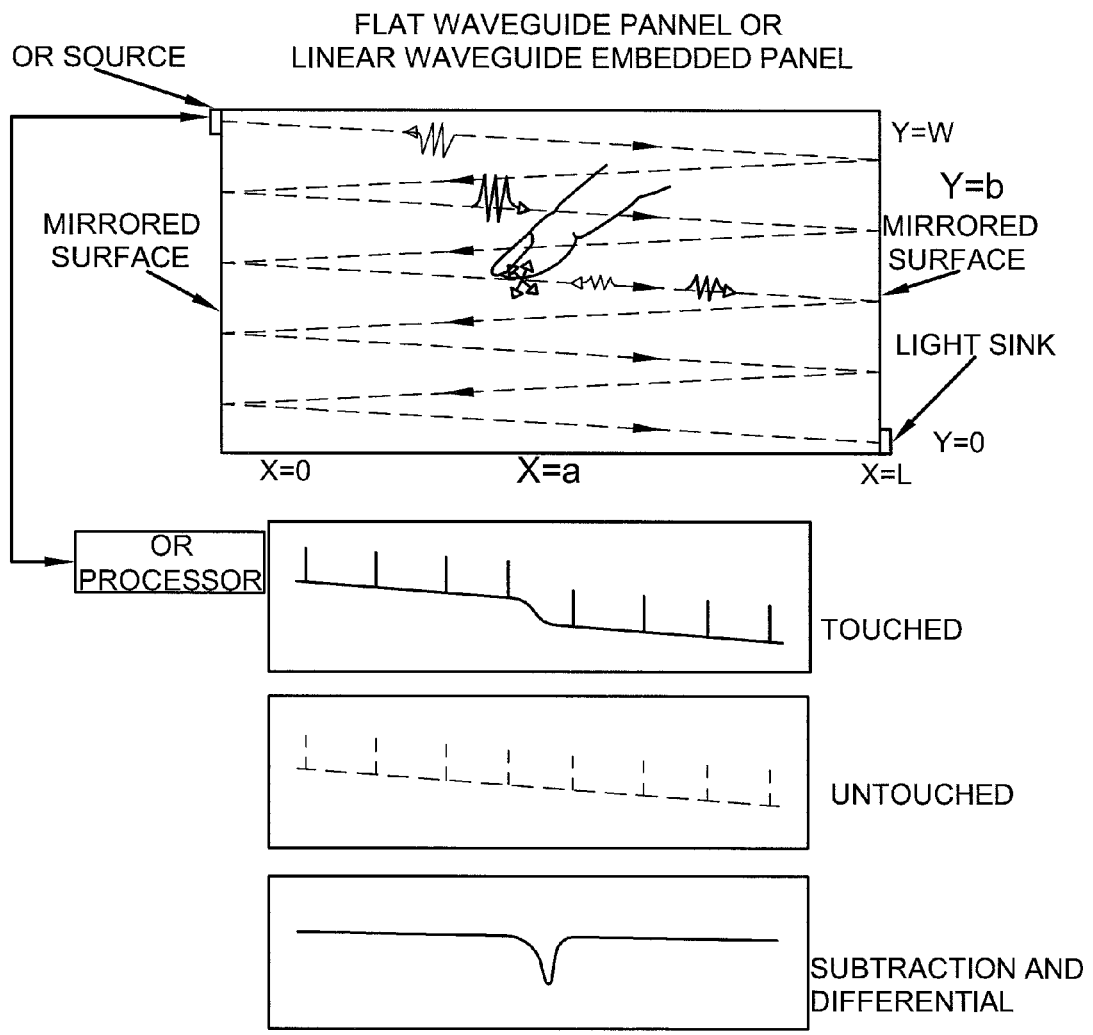

FIG. 11 is a schematic illustration of another preferred embodiment of the present invention: Q2D OTDR (quasi-2 dimensional optical time domain reflectometer).

Figure 12:
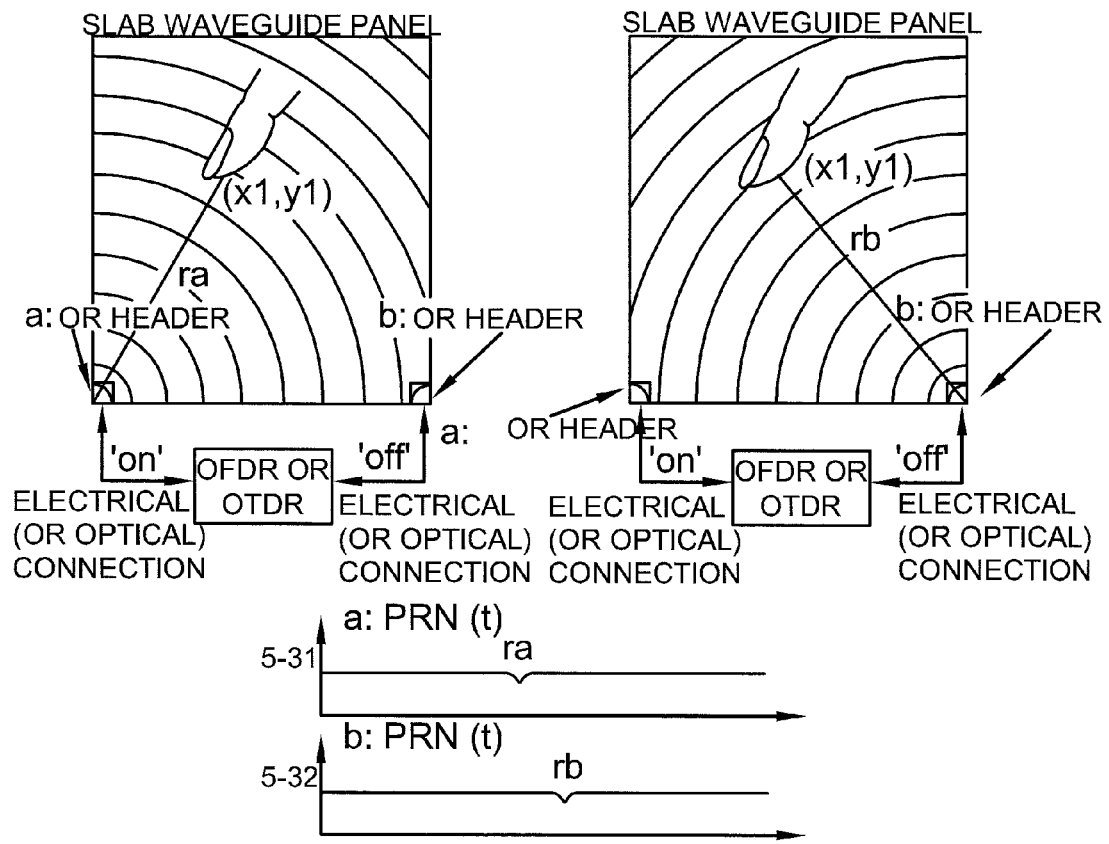

FIG. 12 is a schematic illustration of another preferred embodiment of the present invention called T2D OTDR (Triangulation-2 dimensional optical time domain reflectometer).

Figure 13:
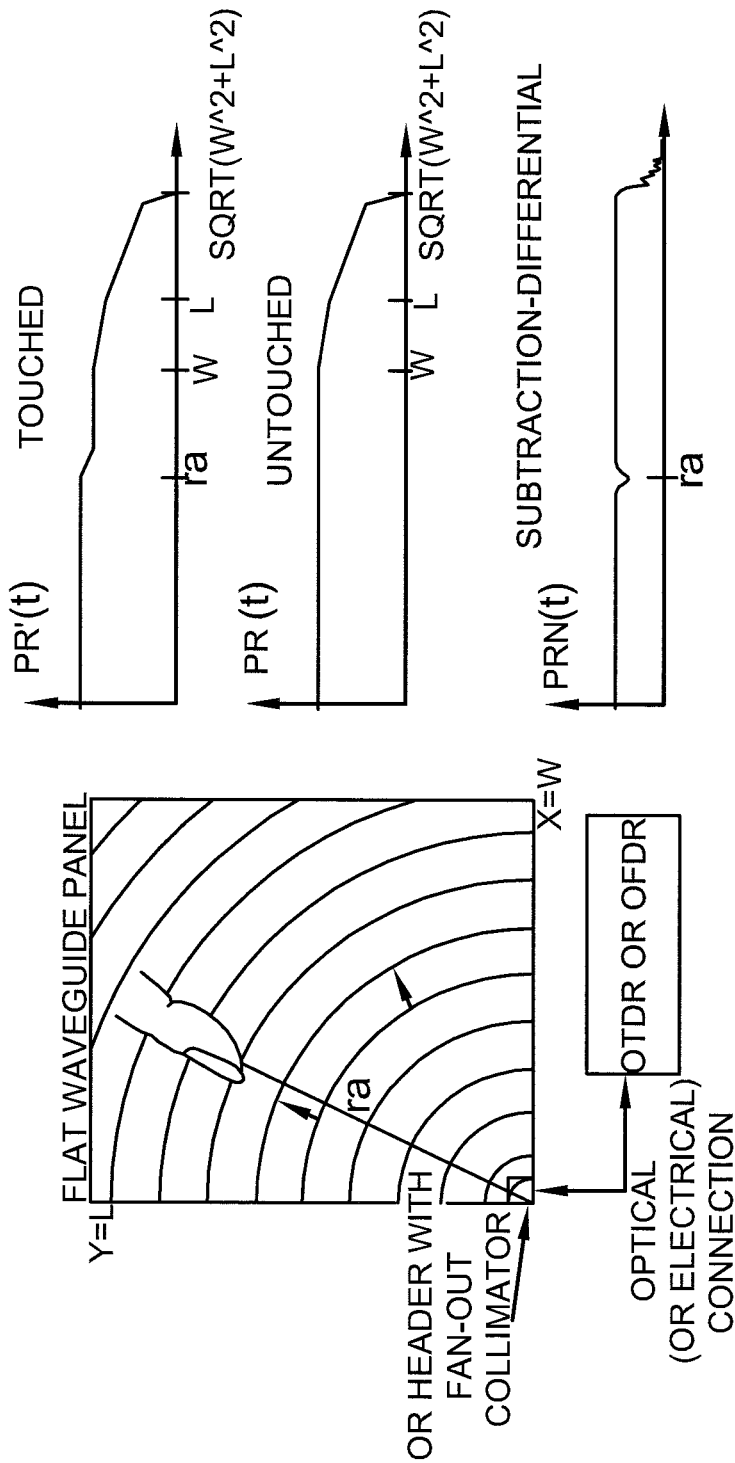

FIG. 13 is a schematic illustration that explains how to process from raw OTDR profile to the final location OTDR profile in T2D OTDR (Triangulation-2 dimensional optical time domain reflectometer) method.

Figure 14:
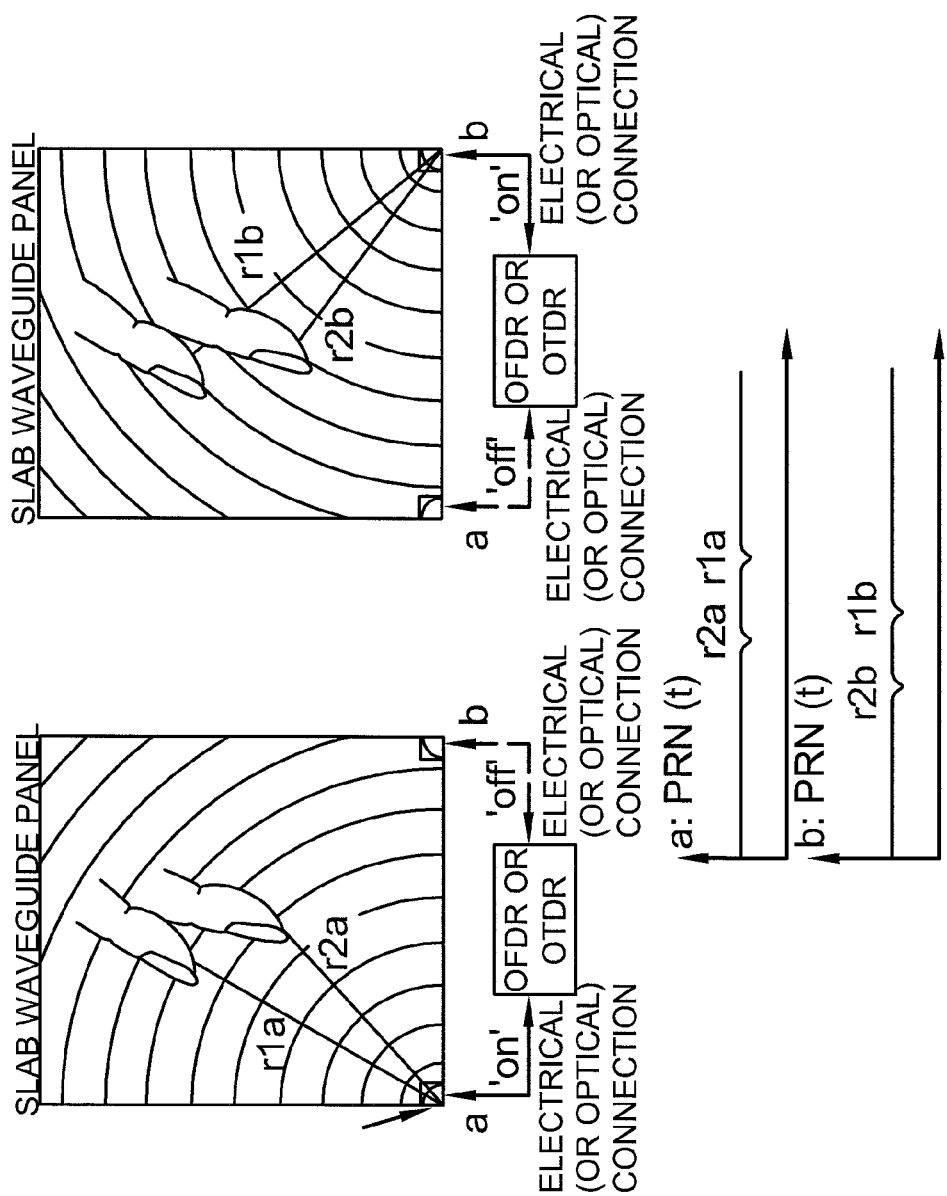

FIG. 14 is a schematic that illustrates multiple touch process.

IV. DETAILED DESCRIPTION OF THE INVENTION

The present invention described in this patent application uses Time Domain Reflection (TDR) technology. TDR is well known and matured technology and is actively used for the characterization of various passive electrical components as well as transmission lines or simple PCB (Printed Circuit Board) conducting trace especially to characterize its high speed electronic signal integrity. For instance, it can be used to locate discontinuities or areas of higher resistance within a conductor.

TDR transmits a short rise time pulse along the conductor. If the conductor is of uniform impedance and properly terminated, the entire transmitted pulse will be absorbed in the far-end termination and no signal will be reflected toward the TDR. Any impedance discontinuities will cause some of the incident signal to be sent back towards the source. This is similar in principle to radar.

Increases in the impedance create a reflection that reinforces the original pulse while decreases in the impedance create a reflection that opposes the original pulse. The resulting reflected pulse that is measured at the output/input to the TDR is displayed or plotted as a function of time and, because the speed of signal propagation is almost constant for a given transmission medium, can be read as a function of cable length. Because of this sensitivity to impedance variations, a TDR may be used to verify cable impedance characteristics, splice and connector locations and associated losses, and estimate cable lengths.

Consider the case where the far end of the cable is shorted (that is, it is terminated into zero ohms impedance). When the rising edge of the pulse is launched down the cable, the voltage at the launching point "steps up" to a given value instantly and the pulse begins propagating down the cable towards the short. When the pulse hits the short, no energy is absorbed at the far end. Instead, an opposing pulse reflects back from the short towards the launching end. It is only when this opposing reflection finally reaches the launch point that the voltage at this launching point abruptly drops back to zero, signaling the fact that there is a short at the end of the cable. That is, the TDR had no indication that there is a short at the end of the cable until its emitted pulse can travel down the cable at roughly the speed of light and the echo can return back up the cable at the same speed. It is only after this round-trip delay that the short can be perceived by the TDR. Assuming that one knows the signal propagation speed in the particular cable-under-test, and then in this way, the distance to the short can be measured.

A similar effect occurs if the far end of the cable is an open circuit (terminated into infinite impedance). In this case, though, the reflection from the far end is polarized identically with the original pulse and adds to it rather than cancelling it out. So after a round-trip delay, the voltage at the TDR abruptly jumps to twice the originally-applied voltage.

Note that a theoretical perfect termination at the far end of the cable would entirely absorb the applied pulse without causing any reflection. In this case, it would be impossible to determine the actual length of the cable. Luckily, perfect terminations are very rare and some small reflection is nearly always caused.

The magnitude of the reflection is referred to as the reflection coefficient or p. The coefficient ranges from 1 (open circuit) to −1 (short circuit). The value of zero means that there is no reflection. The reflection coefficient is calculated as follows:

$$\rho = \frac{Z_t - Z_o}{Z_t + Z_o} \quad (\text{eq 2})$$

Where Zo is defined as the characteristic impedance of the transmission medium and Zt is the impedance of the termination at the far end of the transmission line.

Any discontinuity can be viewed as a termination impedance and substituted as Zt. This includes abrupt changes in the characteristic impedance. As an example, a trace width on a printed circuit board doubled at its midsection would constitute a discontinuity. Some of the energy will be reflected back to the driving source; the remaining energy will be transmitted.

Time domain reflections are commonly used for in-place testing of very long cable runs, where it is impractical to dig up or remove what may be a kilometers-long cable. They are indispensable for preventive maintenance of telecommunication lines, as they can reveal growing resistance levels on joints and connectors as they corrode, and increasing insulation leakage as it degrades and absorbs moisture long before either leads to catastrophic failures. Using a TDR, it is possible to pinpoint a fault to within centimeters.

TDRs are also very useful tools for technical surveillance counter-measures, where they help determine the existence and location of wire taps. The slight change in line impedance caused by the introduction of a tap or splice will show up on the screen of a TDR when connected to a phone line. TDR equipment is also an essential tool in the failure analysis of modern high-frequency printed circuit boards whose signal traces are carefully crafted to emulate transmission lines. By observing reflections, any unsoldered pins of a ball grid array device can be detected. Additionally, short circuited pins can also be detected in a similar fashion.

In a TDR-based level measurement device, a low-energy electromagnetic impulse generated by the sensor's circuitry is propagated along a thin wave guide (also referred to as a probe)—usually a metal rod or a steel cable. When this impulse hits the surface of the medium to be measured, part of the impulse energy is reflected back up the probe to the circuitry which then calculates the fluid level from the time difference between the impulse sent and the impulse reflected (in nanoseconds). The sensors can output the analyzed level as a continuous analog signal or switch output signals. In TDR technology, the impulse velocity is primarily affected by the permittivity of the medium through which the pulse propagates, which can vary greatly by the moisture content and temperature of the medium. In most cases, this can be corrected for without undue difficulty.

With regards to the present invention, a use of TDR for touch-screen is disclosed. There are many simplified equations to calculate the excessive capacitance or inductance from characteristic impedance based on the reflection coefficient (eq2). But the time domain location is matched to physical location of the electrode transmission line as follows;

$$X\text{touched} = (Td/2) * \text{velocity of light in touch medium} \quad (\text{eq 1})$$

(where typical touch medium consists of glass and air and Td is the absolute impairment location in time domain reflectometer profile)

Specific locations of the touch events can be extracted by subtraction of the baseline profile from the measured profile to extract excessive amount from characteristic impedance of transmission electrode line, where characteristic impedance represent non-touched ideal transmission electrode's impedance.

Figure 1:
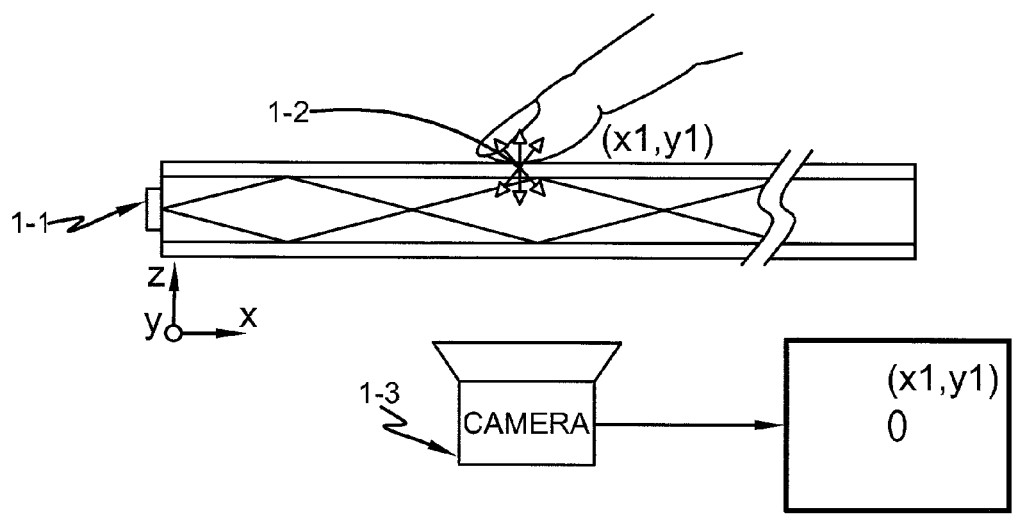
FIG. 1 is a simplified view of prior art: FTIR. Infrared light is captured by TIR condition where touches frustrate the TIR condition and leaking light can be captured by external camera or image sensor array.
Figure 2:
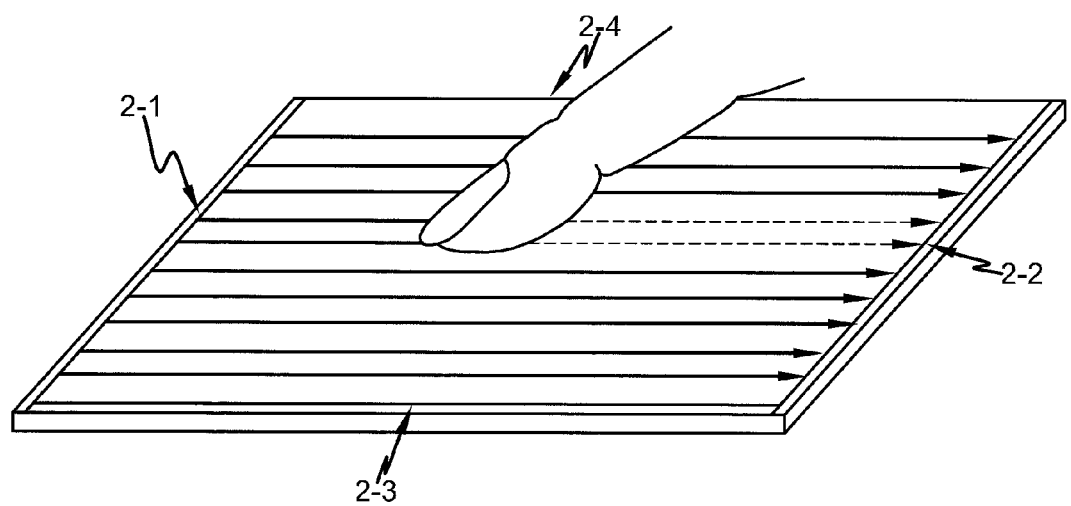
FIG. 2 is a schematic illustration of prior arts that has probing signal transmitter array is on one side and detector array on the other side. The source type could be either optical (or infrared light) or ultrasonic (SAW).
Figure 3:
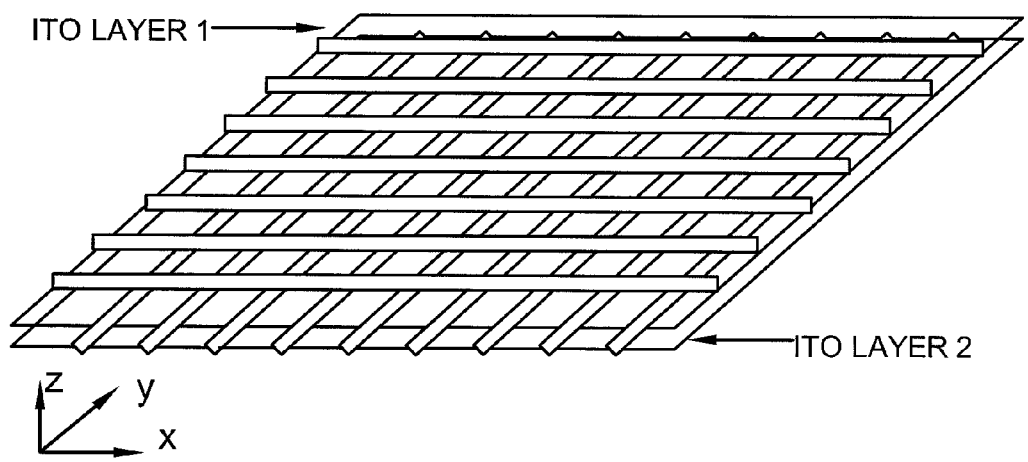
FIG. 3 is a schematic illustration of prior arts that has two ITO layer. When it touched by external objects, the raw electrodes in layer 1 provides y-axis location information of the touch and the column electrodes in layer 2 provides x-axis information.
Figure 4:
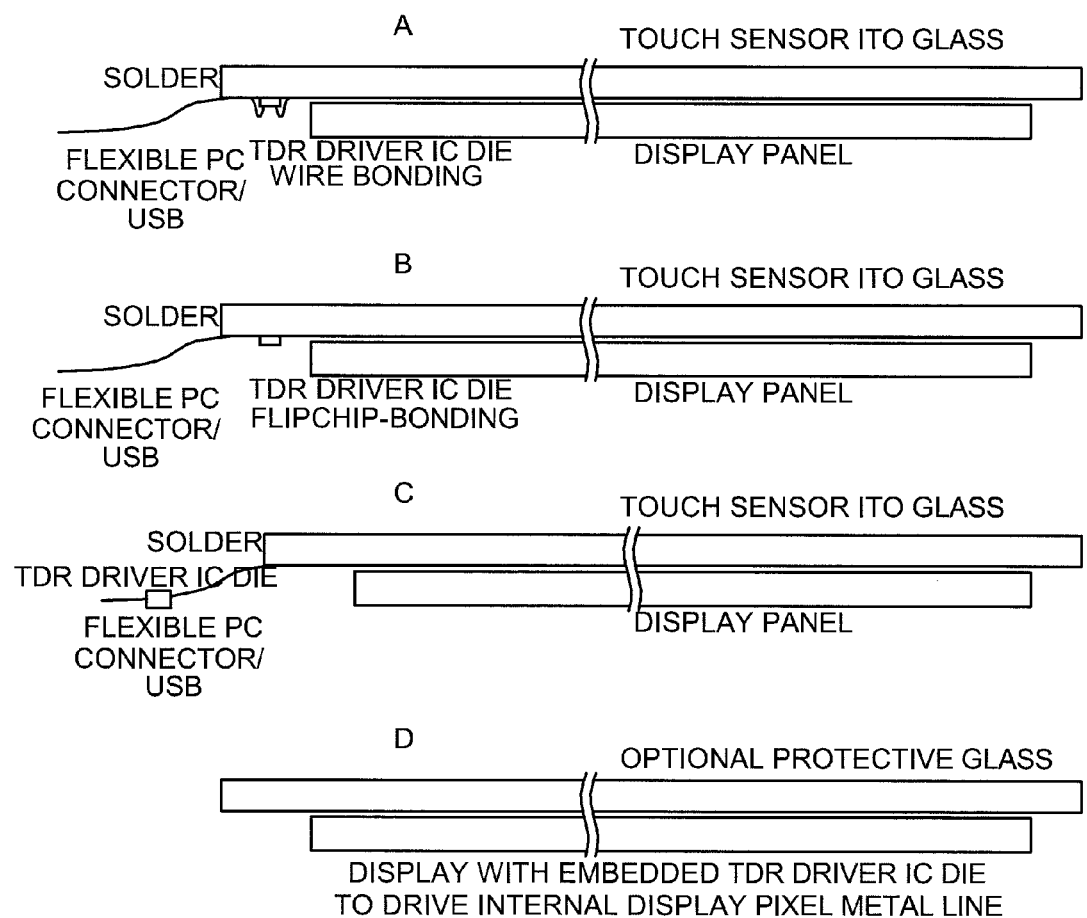
FIG. 4 shows three different proposed electrical TDR touch driver IC and electrode configuration which has sensor ITO pattern electrically connected through flexible PC board as in conventional capacitive and resistive touch sensor method as well as display panel with embedded TDR driver in which case no ITO glass is needed for sensor electrode.
Figure 5:
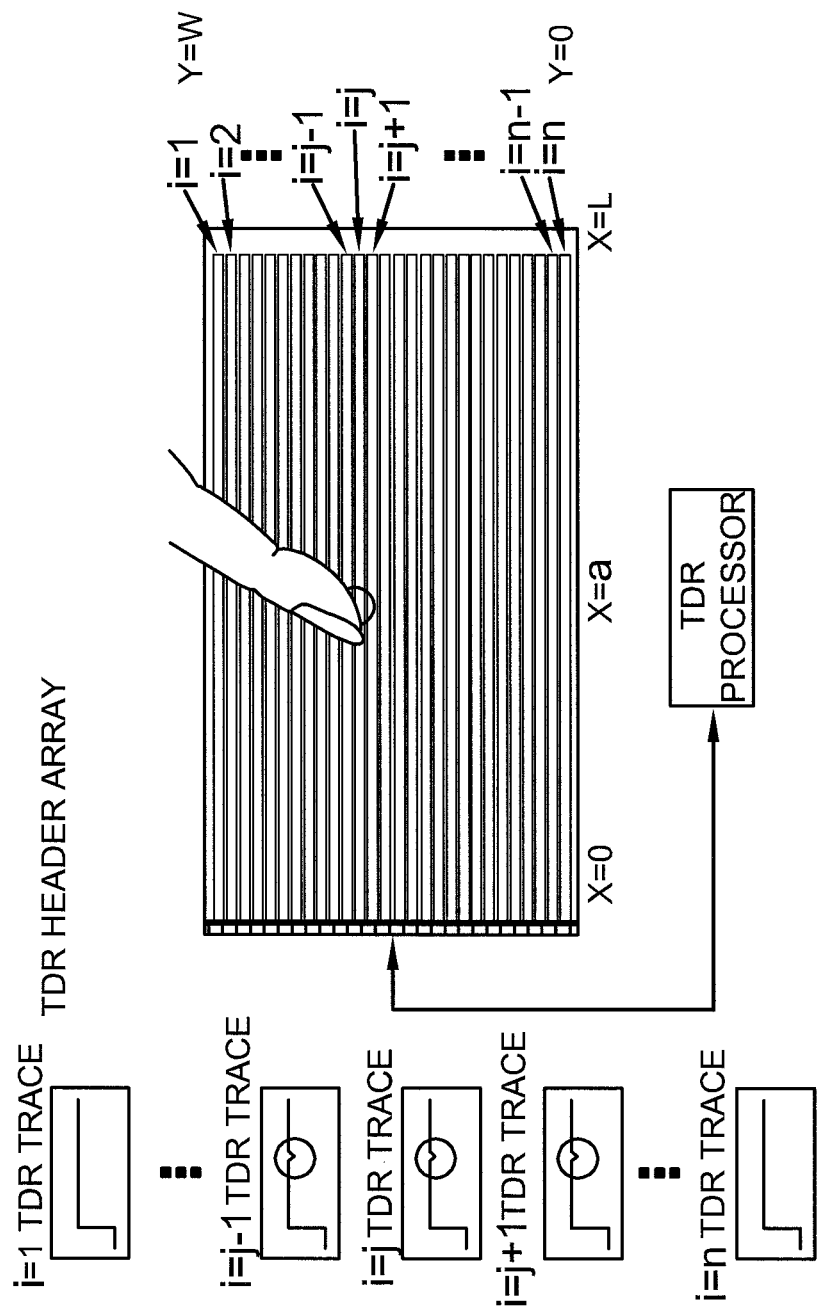
FIG. 5 is a schematic illustration of one embodiment of the present invention with multiples of the raw electrodes and separate TDR header in array. Three sunken locations in TDR profile represents capacitive discontinuities induced by the finger in time-domain whereas the raw numbers indicate the y-axis location of touch, in this case, those are i=j−1, j, and j+1.

FIG. 4 shows three representative possible embodiments for electrode and TDR driver IC configuration. One can attach the bare driver IC chip on the glass and wire-bond to the ITO electrode (a) or flipchip on the glass (b). Flip chip is the preferable method because it has shorter chip-to-printed pattern distance. Wire bonding as an alternative has a long connecting wire compared to flip chip bonding. Shorter chip to printed circuit board provide increased probing quality because it is less parasitic for high speed interconnection. In the alternative it is also possible to place TDR driver IC on the flexible PCB or other PCB but using flexible PCB as interconnection purpose. TDR driver can be array IC as shown in FIG. 5 (Top view) or only one driver but with long electrode of serpentine shape electrode as in FIG. 7 or one driver with fan-out electrode with distribution switch on the flexible PCB or PCB or glass. One other possible embodiment is not using ITO glass but using metal lines in display panel to drive display pixel. This could be applied in time multiplexed way to measure TDR response when driving display signal is in any idling period.

FIG. 5 shows one of preferred embodiments of present invention named 2 Dimensional Time Domain Reflection (2D TDR). 2D TDR is named after the fact that it characterizes '2-dimensional' area of sensor panel although it uses an array source (1-dimensional). In the figure, multiples of TDR headers that form an array are located in one side of the display panel. TDR step pulse is launched onto each thin ITO electrode line as shown in FIGS. 4A, 4B, and 4C. When any external objects touch or be close to the surface, the raw electrode shows capacitive TDR profile. In this case, electrode number, i=j−1, j, j+1 conductor which indicates the vertical location, show capacitive valley at around the middle of profile which indicates the horizontal location of the finger touch. TDR header is step pulse or short pulse generator to send TDR signal onto physical sensor electrode. TDR processor is a microprocessor or computer processor for processing the raw information into meaningful touch movement vector information at each time sequence so that display device know the cursor location and movement information and follow the finger or touch gesture. The step pulse is only one type of probing signal. Other technologies using short pulse or frequency sweeping can be used for probing signal as well. All these signals use the reflected signal (TDR). The gesture capturing process using TDR processor is summarized in the flow chart (FIG. 6).

Figure 7:
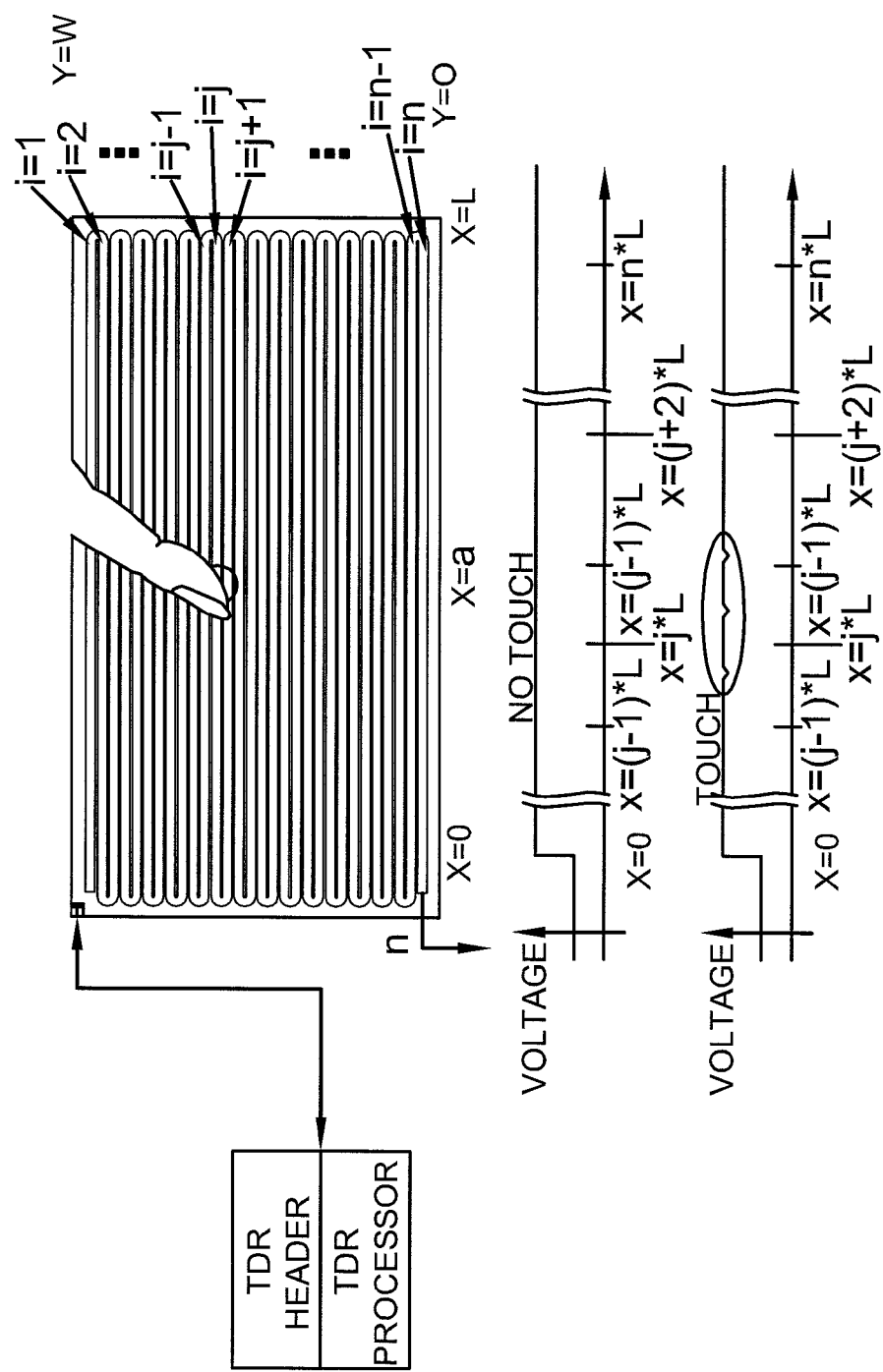
FIG. 7 is a schematic illustration of one embodiment of the present invention with single long serpentine electrode. Three sunken locations in TDR profile represents capacitive discontinuities induced by the finger in time-domain whereas the raw numbers are indicating the unfolded location of touch points and translated into y-axis location same as FIG. 5 case.

As another possible embodiment shown in FIG. 7, instead using array TDR headers (Multiple TDR driver ICs) with multiple electrodes, only one TDR header with serpentine electrode is used. The figure also shows the difference between touched and untouched TDR profile. In this application, the profiles are hypothetically drawn just to show how to extract the location information figuratively: simple subtraction gives the bump location as in the figure. Although it uses one TDR header instead using array header as in 2D TDR (FIG. 5) case but still scans the area as if it sends step pulse signals in parallel, the method is given the named of 'quasi-2 dimensional (Q2D)' Time domain reflectometer: Q2D TDR. Reflection signal level decreases as electrode length becomes longer. This obviously makes its sensitivity or SNR (Signal-to-Noise ratio) poor of its sensing signal as a drawback of this method. In effect, therefore, a single linear conductor and TDR can determine the impact of a finger over a two-dimensional area.

Figure 6:
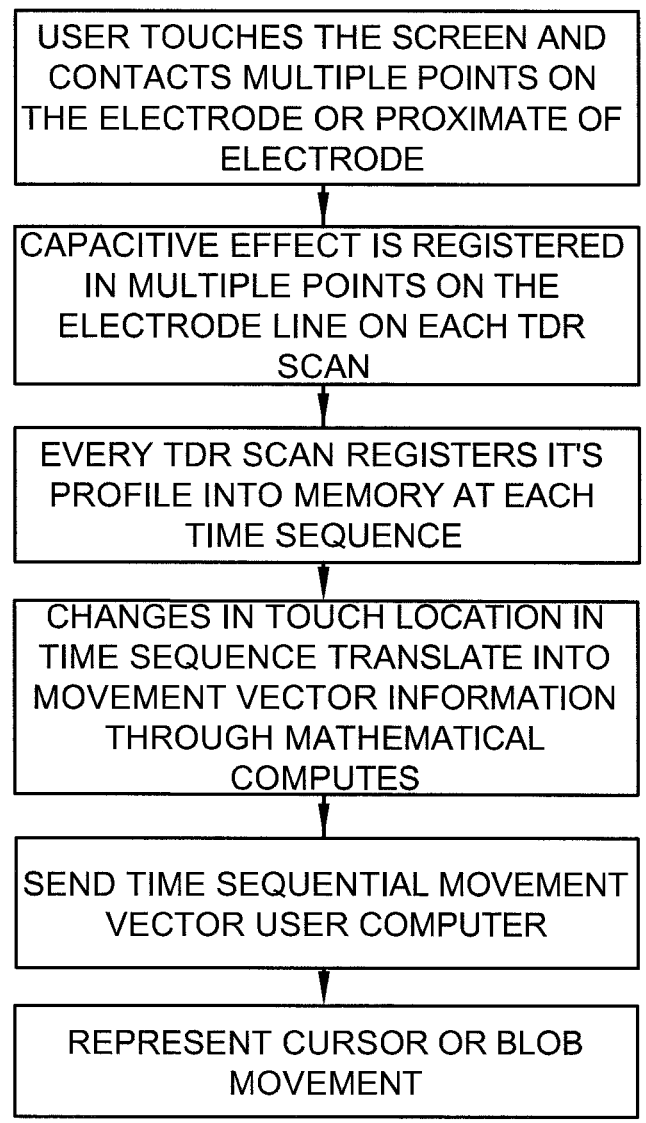
FIG. 6 shows flow chart that represents the main routine for touch (TDR) processor.

When more than one finger has been touched, FIG. 6 illustrates how Q2D behaves. As shown in the figure, the touch id F[A] and F[B] shows capacitive valleys symmetrically around the each edge location of electrode. For example, $F[A]-F[B]$: $F[B]-F[A]$ around $x=j*L$ location.

FIG. 9 shows another embodiment with multiple electrodes of 2D TDR method. Instead using multiple TDR headers, an analog switch with one TDR header can be time-multiplexed to scan TDR profile of each electrode.

The present invention also describes using optical Time Domain Reflectometer (OTDR) technology for a touch-screen sensor. OTDR (optical time domain reflectometer) is one of well known and matured technologies in fiber optic component and fiber characterization. OTDR is actively used for the characterization of various optical components and for fault detection of passive optical networks or optical fiber transmission network. There are two main streams in OR technology field; OTDR (optical time domain reflectometer) and OFDR (optical frequency domain reflectometer). Similar technology concept could also be found in OCT (optical coherent tomography) of the medical diagnostic equipment. The main difference between the OR (representing both OTDR and OFDR) and OCT is that the first focuses on one dimensional reflection profile where as the latter on 3-dimensional optical reflection profile as in the example disclosure of U.S. Pat. No. 6,160,826A. It is noteworthy that the said one-dimensional optical reflectometer such as OTDR and OFDR uses single point (O-dimensional) probing source whereas 3-dimensional optical reflectometer technology such as OCT uses 2-dimensional array sources. Many other literatures can be found in those applications and explain about the technologies in detail.

In the prior art, an optical time-domain reflection (OTDR) is an optoelectronic instrument used to characterize an optical fiber. An OTDR injects a series of optical pulses into the fiber under test. It also extracts, from the same end of the fiber, light that is scattered (Rayleigh Backscatter) or reflected back from points along the fiber. (This is equivalent to the way that an electronic time-domain reflection measures reflections caused by changes in the impedance of the cable under test.) The strength of the return pulses is measured and integrated as a function of time, and is plotted as a function of fiber length.

An OTDR may be used for estimating the fiber's length and overall attenuation, including splice and mated-connector losses. It may also be used to locate faults, such as breaks, and to measure optical return loss.

As disclosed in the present invention, EFT (Evanescent Field Touch) technology, in essence is summarized as a touch sensing technology for finding touch point(s) using optical time domain reflectometer (OTDR) principle. The OTDR header plays an important role for the present invention as a probing and sensing element to detect the touched area as it characterizes the 'device under test' when it acts as optical component characterization test equipment. In principle, an OTDR header sends optical probing signal out to the optical component under test and then receive the reflection signal in time domain or in (electrical carrier or optical carrier) frequency domain. Optical Frequency Domain Reflectometer technique so called OFDR can also applicable concept but in this invention treated as the same technique because it is mere Fourier Transform pair of reflection information. Indeed some OTDR manufacturer uses OFDR to reproduce OTDR meter.

When one touches the glass waveguide surface, the evanescent field of touched area on the air-to-glass interface is experiencing optical loss on the touched area. Then measured OTDR profile is to be compared to the untouched baseline profile and the results will be reported with the location of touched area. In a sequential time frame of 2-dimensaional images can be processed further for gesture recognition.

FIG. 10 shows one of preferred embodiments of present invention named 2D OTDR (2 dimensional optical time domain reflectometer). 2D OTDR is named after the fact that it uses an array source (1-dimensional) to characterize '2-dimensional' area of sensor panel. Therefore 2D OTDR can either be interpreted as an extended version of one-dimensional OTDR technology (or OFDR technology) or be the degenerated version of three-dimensional OTDR technology such as OCT technology. (Refer to the previous section of this specification in terms of dimensional consideration.) In the figure, multiples of OTDR headers that form an array are located in one side of the display panel. An infrared light pulse is launched into the transparent touch-panel along an optical path from OTDR header and each path generates the OTDR profile as in the figure either in sequence or in parallel. From this light, Rayleigh backscattering (RBS) light provides the background optical noise level. As such, RBS plays a crucial role to provide background optical power that forms the said baseline profile. When finger touches the screen, RBS power is reduced by the optical loss due to the said EFT. The reflection of the light pulse is received by the optical header, and the OTDR header array captures all the reflection profile sequentially or concurrently to register the location of touch as shown in FIG. 10.

FIG. 11 shows another possible embodiment. Instead using array OR head, flat panel edges are reflector coated (or taped) to create folded ghost optical path as one long optical trace. The figure shows the difference between touched and untouched OTDR profile. In this application, the profiles are hypothetically drawn just to show how to extract the location information figuratively: subtraction and differential gives location bump as in the figure. Although it uses one OR header instead using array header as in 2D OTDR (FIG. 10) case but still scans area as if it sends optical probe signals in parallel, the method is given the named of 'quasi-2 dimensional (Q2D)' optical time domain reflectometer: Q2D OTDR. In this case RBS power may become an issue. Because RBS capture is inversely proportional to the distance from its source unless it is guided. So this obviously makes its sensitivity or SNR (Signal-to-Noise ratio) poor of its sensing signal. Optical paths may be a linear waveguide such as fiber that can be embedded to increase RBS capture rate or using optical amplification doping material can help to get better RBS power and SNR. This method may not be attractive because of the extra cost involved in the extra material and process for optical panel. However Q2D OTDR has its value in terms of its excellent scalability without changing any hardware and its simplicity for hardware design.

FIG. 12 is another example embodiment using OR named T2D OTDR (Triangulation-2 dimensional optical time domain reflectometer). Two OTDR headers are located at the two corners of the sensor panel and measure the distance and depth of touch points by optical losses. Two distances from known coordinates will generate the exact position of the touch point(s). FIG. 13 shows how to calculate the touch location from one OTDR corner header. Although there are two inflection points of the OTDR profile due to two edges at x=W and y=L, the same principle of subtraction and differential is used and shows an optical loss valley for a touch point as in the figure. In this case, the valley only indicates the radial location. Exact location in x-y coordinate will be derived by two OTDR profiles using trigonometric relations as described earlier and shown in FIG. 12. The same derivation method can be used in multi-touch case as in FIG. 14.

I claim:

1. A touch-screen sensor for determining touch characteristics, the sensor comprising:
   a. a sensing surface;
   b. one or more folded optical paths mounted on said sensing surface;
   c. an optical time-domain reflectometer header having an optical connection to said one or more optical paths to provide a light probing signal to the optical path and to receive a reflected pulse from the optical path; and
   d. a microprocessor electrically-connected to each said header wherein said headers communicates light probing signal and reflected signal information of the optical path to the microprocessor, and the microprocessor determines a touch location using optical time-domain reflectometer.

2. A touch-screen sensor for determining touch characteristics, the sensor comprising:
   a. a sensing surface;
   b. a light sink at an edge of the surface;
   c. one or more optical paths mounted on said sensing surface;
   d. one or more optical time-domain reflectometer headers each having an optical connection to said one or more optical paths to provide a light probing signal to the optical path and to receive a reflected pulse from the optical path; and
   e. a microprocessor electrically-connected to each said header wherein said headers communicate light probing signal and reflected signal information of the optical path to the microprocessor, and the microprocessor determines a touch location using optical time-domain reflectometer, and wherein the sensing surface has mirrored sides, and the header projects a light path that reflects from the mirrored sides so as to create a continuous light path across the surface from the header to the light sink.

3. A touch-screen sensor for determining touch characteristics, the sensor comprising:
   a. a sensing surface comprising reflective edges;
   b. one or more optical paths mounted on said sensing surface;
   c. one or more optical time-domain reflectometer headers each having an optical connection to said one or more optical paths to provide a light probing signal to the optical path and to receive a reflected pulse from the optical path; and
   d. a microprocessor electrically-connected to each said header wherein said headers communicate light probing signal and reflected signal information of the optical path to the microprocessor, and the microprocessor determines a touch location using optical time-domain reflectometer, and wherein the one or more optical paths are reflected against said edges to become folded.

* * * * *